Feb. 16, 1960

A. O. BATES 2,925,095

VALVE

Original Filed Nov. 23, 1954

INVENTOR.
Alfred O. Bates
BY
Bates, Peare & McBean
Attorneys

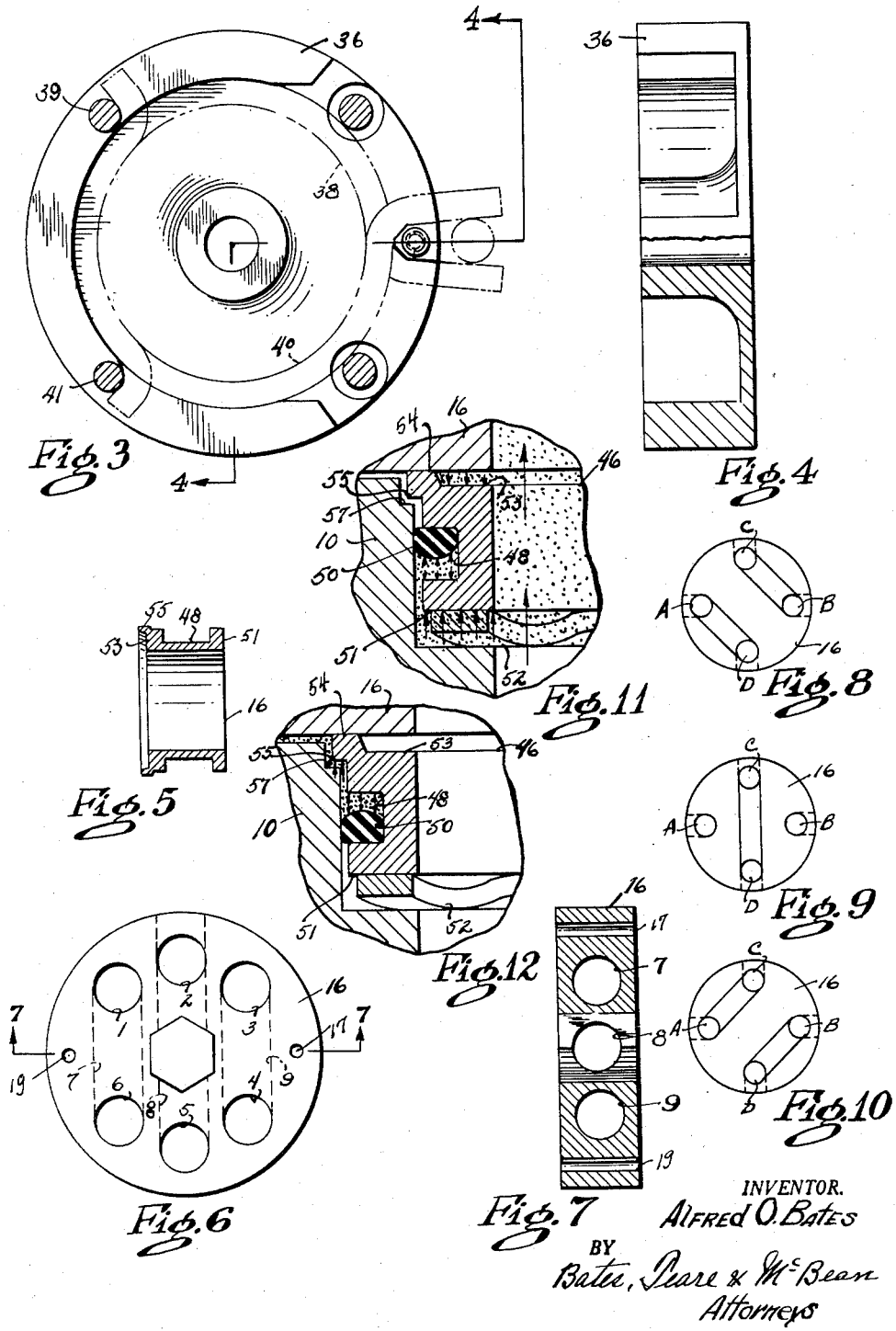

United States Patent Office 2,925,095
Patented Feb. 16, 1960

2,925,095
VALVE

Alfred O. Bates, Cleveland Heights, Ohio

Original application November 23, 1954, Serial No. 470,923. Divided and this application February 16, 1956, Serial No. 566,049

3 Claims. (Cl. 137—625.43)

This invention relates to values generally and more particularly it relates to an improved type of selector valve for directional control of fluids under pressure. This application is a division of my co-pending application Serial No. 470,923 filed November 23, 1954, now abandoned.

Conventional selector values for directional control of fluids under pressure are plagued with persistent problems of relatively high turning torque and leakage. The service applications of such valves include flow control of air, fuel, gas, hydraulic oils, petroleum and water with working pressures varying from 0 to 3000 p.s.i. for air and gas and from 0 to 6000 p.s.i. and higher for liquids. Various types of arrangements have been attempted to overcome these problems, such as improving the sealing members and providing thrust accommodating members in an attempt to offset the directional pressure of the fluids. However, these attempts have generally not been satisfactory and it is a principal objective of this invention to eliminate these problems and to assure smooth and easy valving of fluids over a wide range of high operating pressures.

A more specific object of this invention relates to the provision of a rotary selector valve construction for directinal control of fluid under pressure which will have a relatively low turning torque.

An additional specific object of this invention is the provision of seals for selector valves of the type indicated wherein the sealing action improves as the pressure increases.

A still further specific object of this invention is the provision of a directional selector valve for high-pressure fluids which will have a minimum of operative parts which are pressure loaded in operation to provide minimum wear and long life.

Briefly, the foregoing objectives are attained in accordance with this invention by providing a ported valve body having an internal valve chamber within which a valving selector disc is rotatably supported on a shaft that extends externally and is provided with a positioning handle. Blind holes are provided opposite the ports in the valve body to apply the fluid pressure to both sides of the valving disc thereby equalizing the pressure on either side of the disc so that it floats freely within the value chamber to eliminate the necessity for thrust members of any kind. As a result, the turning torque required to position the disc is materially reduced and is relatively independent of the fluid pressure. The valve assembly also utilizes pressure seals which include sealing rings that are designed to effectively eliminate cross leakage within the valve body regardless of the fluid pressure or its direction of flow. These and other improved features will become more apparent in the accompanying drawings and detailed description.

In the drawings:

Fig. 3 is a view taken along the lines 3—3 in Fig. 2 of the drawings;

Fig. 4 is a view taken along the lines 4—4 in Fig. 3 of the drawings and illustrating in partial section the torsion spring housing for the handle;

Fig. 5 is a detailed section view of one of the sealing rings otherwise shown in Fig. 2;

Fig. 6 is a face view of the valving disc;

Figure 1:
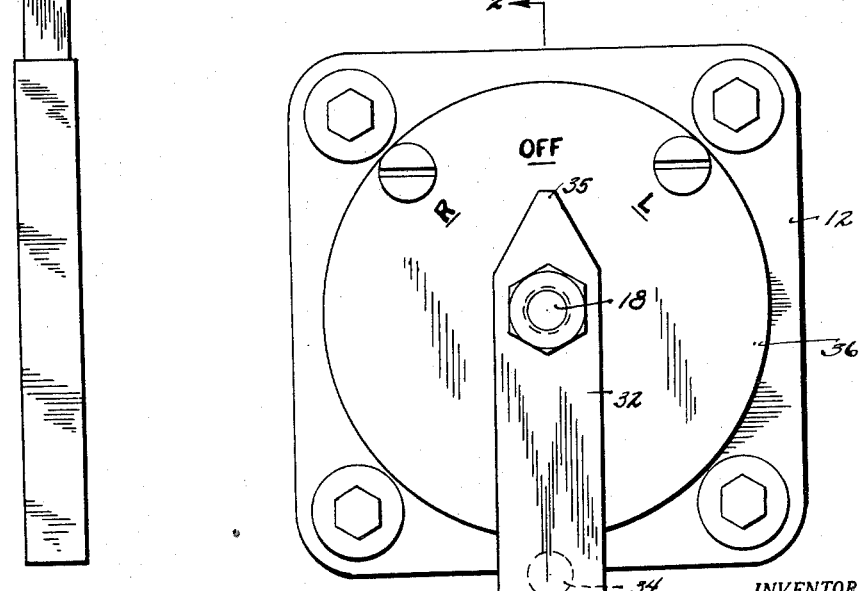
Fig. 1 is a top view of a four-way rotary selector valve having an open center.

Fig. 7 is a sectional view of the valving disc taken along the lines 7—7 in Fig. 6; while Figs. 8, 9 and 10 are diagrammatic illustrations of the flow conditions of the valving disc when the handle is positioned respectively in the positions indicated on the top panel in Fig. 1 of the drawings; and Figs. 11 and 12 are enlarged partial sectional views of the internal pressure sealing within the valve during flow and of the external pressure sealing within the valve during no flow respectively.

Figure 2:
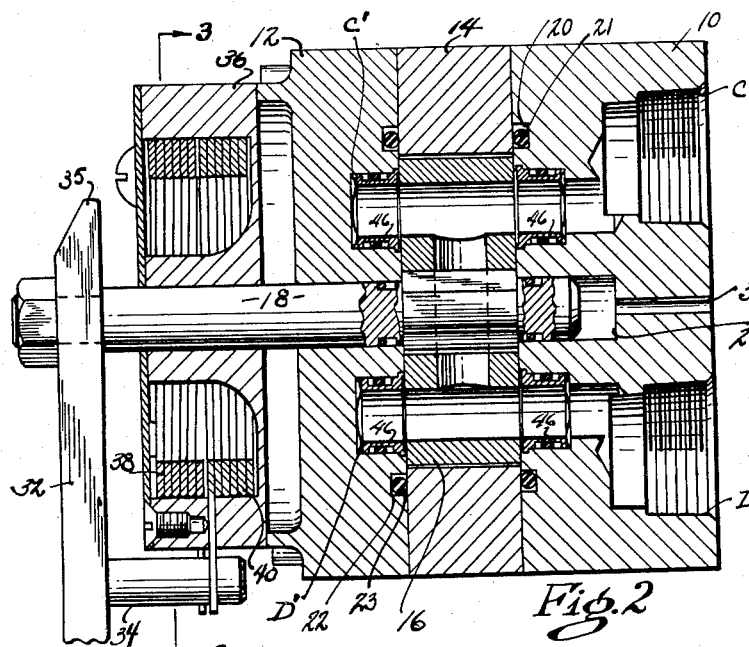
Fig. 2 is a sectional view taken along the lines 2—2 in Fig. 1.

Referring now more particularly to Figs. 1 and 2 of the drawings, there is shown a four-way, rotary selector valve having an open center for the directional flow control of fluids under high pressure. The assembly includes a valve body 10 having four symmetrically arranged through ports designated generally A, B, C and D and each of which are internally threaded to receive connecting conduits in the exemplary manner shown by the cross-sectional view of Fig. 2 of the drawings. The assembly also includes a valve cap 12 which is separated from the valve body 10 when assembled by an annular spacer member 14 whose central opening forms a valve chamber common to all of the ports in the valve body 10. A circular gate or valving disc 16 having a plurality of through axial passageways, 1 through 6, 17 and 19 adapted for selective alignment with the ports A, B, C and D in the valve body 10 and including transverse passageways 7, 8 and 9 in the plane of the disc for establishing communication between the axial passageways is supported on a suitable shaft within the valve chamber for rotation into different operative positions, as will hereinafter be more fully described.

In order to eliminate the necessity for thrust members of any kind, the valve cap 12 is provided with a plurality fo blind holes A', B', C' and D' which are positioned exactly opposite and are of the same size as the ported openings A, B, C and D in the valve body 10. When fluid under pressure passes from any of the ported openings A, B, C or D into any of the aligned passageways 1 through 6 of the valving disc 16, the fluid is conducted to both sides of the valving disc 16 to equalize the fluid pressures acting against the disc in a manner which practically permits the valving disc 16 to float freely within the valve chamber. The floating support for the valving disc 16 within the valve chamber not only eliminates the need for thrust members, but also reduces greatly the amount of turning torque required on the handle to rotate the disc within the chamber. This greatly reduced turning torque is available at all operating pressures, since the pressure balancing of the valving disc 16 renders its rotation independent of the fluid pressure. As best shown in Fig. 2 of the drawings, the opposing faces of the valve body 10 and the valve cap 12 in the valve chamber are provided with mating annular grooves 20 and 22 each of which supports an annular O ring 21 and 23 respectiely to provide an external seal for the valve chamber. Depending upon the type of service, the valve body 10 can be made of high tensile bronze as for air, gas, fuel or water or of high tensile steel as for oil or petroleum service. Similarly, the valving disc 16 is preferably made of hardened stainless steel and the matching internal faces of the valve body and cap are preferably hard-chrome plated with the bearing surfaces lapped flat and smooth to aid in minimizing the interport leakage while the valve disc is turning.

One end of the shaft extends through the valve cap 12 while the other end extends into a seat 24 in the internal face of the valve body 10. Axially spaced annular grooves 26 and 28 are machined into the shaft 18 to support suitable O rings on either side of the valve chamber. A vent 30 extends from the valve seat 24 through the external wall of the valve body 10 to provide a pressure relief for any pressure that may build up within the seat. The external end of the shaft carries a suitable handle 32 to permit manual rotation of the valving disc 16 in a manner to be hereinafter more fully described.

In the preferred form shown in Figs. 1 and 2, the valve cap 12 supports a spring housing 36 which encloses a pair of oil-tempered torsion springs 38 and 40 acting in opposition to each other to automatically return the handle 32 to the neutral or "Off" position. One end of each of the torsion springs is engaged by a suitable pin 39 and 41 respectively carried by the spring housing 36. The other extremity of each of the torsion springs is bent outwardly to extend and engage opposite sides of a depending pin 34 carried by the handle 32. Thus, if the handle is turned in either direction, it works against the corresponding torsion spring loading and is automatically returned to the neutral position when released by the operator. This arrangement provides a convenient handle centering device which may, if desired, be replaced with conventional ball and detent stops for each of the respective valve positions. The directional flow information may be suitably indicated on the panel plate 42 affixed to the top face of the cap 12 which, together with a pointer 35 on the handle and numbered detent stops if used, serve to completely indicate the condition of flow through the valve.

Referring again to Fig. 2 of the drawings, it will be seen that the interior extremity of the ported openings A, B, C and D in the valve body 10 and the blind holes A', B', C' and D' in the valve cap 12 each carry suitable sealing rings 46 provided with external annular grooves 48 in which are seated O rings 50 of synthetic rubber or the like which effectively eliminate cross leakage within the valve. Each sealing ring assembly also includes a suitable back-up ring in the form of a wave spring 52 acting in a direction to urge the sealing rings into sealing contact against the valve selector disc 16. Referring now more particularly to the enlarged views in Figs. 11 and 12 of the drawings, it will be seen that the sealing rings 46 not only prevent leakage through their coaction with the O-rings but they are also designed so that there is a greater area presented to the fluid pressure on the bottom surface 51 than on the exposed undercut portion 53 of the face adjacent the valving disc. With this construction the seals are always forced against the face of the valving disc 16 when fluid is being transferred through the valve and, as the pressure in the system increases the seals are held in tighter contact with the valving disc due to the slight pressure unbalance acting on the seal as diagrammatically shown by the directional arrows in Figs. 11 and 12.

The same pressure unbalance acts against the sealing rings when the ports are closed and the pressure exists only in the disc cavity. This is accomplished by providing another differential in the sealing ring areas which are exposed to the back pressure from the disc cavity. Thus, the undercut portion 53 on the disc side of the sealing ring and the overhanging shoulder 55 coact respectively with the bottom surface 51 and the mating undercut corner 57 or the valve body 10 to produce the same pressure loading of the seals against the valving disc whether the pressure is in the port as shown in Fig. 11 or in the valve chamber as shown in Fig. 12, thereby producing a double seal under all conditions to reduce the possibility of leakage. For optimum sealing, in each case, the active differential loading area of the sealing ring should preferably be substantially the same when the pressure is in the port and when it is in the disc cavity. Similarly, the differential loading area in each case should preferably not be less than one-half the contact area of the seal; in which case the additional loading of the wave spring 52 will maintain the seal regardless of the pressure. In Figs. 11 and 12, assuming that the space between the port and the sleeve is negligible, the active differential area when pressure is in the port is the difference between the area of the surface 51 and the area of the undercut surface 53, while the active differential area when the pressure is in the disc cavity is the area of the portion of the shoulder 55 which overhangs the undercut corner 57 of the valve body 10. The contact area of the seal is the raised marginal surface 54 of the sealing ring which engages the disc 16. The additional loading of the spring should preferably be sufficient to increase the sealing force to equal what would be supplied by a pressurized area of approximately 55% of the contact area of the seal. In operation the seals are so effective that even a complete fall off of pressure, or application of back pressure will not unseat the seals.

Returning now to Figs. 6 and 7 of the drawings, it will be seen that the axially disposed through passageways 1 through 6, 17 and 19 are circumferentially spaced from each other around the disc 16 and in a symmetrical pattern about the axis of rotation. These passageways are so located that the seals in the cap 12 are always in communication with their respective seals in the valve body 10 and the disc 16 is always pressure balanced. In the embodiment of the disc shown in Figs. 6 and 7 of the drawings, additional passageways 19 and 17 are provided to assure that the seals on both sides of the disc are subject to pressure at all times regardless of the position of the disc 16 in the cavity. The transverse passageways 7, 8 and 9 in the plane of the disc 16 are represented by dotted lines in Fig. 6 and by solid line openings in Fig. 7 of the drawings. This valving disc 16 is merely exemplary of various types that may be utilized in conjunction with the ported valve body 10 shown in Figs. 1 and 2 of the drawings and results in the conditions of flow diagrammatically illustrated in Figs. 8 through 10 where only the communicating passageways are shown in solid lines. Thus, Fig. 8 represents the flow condition when the handle 32 is turned to the left and the pointer 35 is aligned with the indicator numeral "L" to establish pressure at the port A while connecting the port B to exhaust at C. Fig. 9, on the other hand, represents the flow condition when the handle 32 is neutrally positioned with the indicating pointer at the "Off" marking to isolate both ports A and B from the fluid pressure while connecting the pressure supply D directly to the exhaust C. In Fig. 10, the handle 32 has been turned to the right to a position where the pointer 35 is aligned with the indicator numeral "R" to establish a flow condition where the fluid pressure is applied to the port B while the port A is connected to exhaust C.

Many different types of directional arrangements may be provided such as a two-way shut-off, a three-way or a four-way selector and others each with either side or bottom porting of the valve body and each with an appropriate selector valving disc which can be positioned by means of the shaft 18 to control the direction of flow or shut-off in any type of high pressure installation. These valves have been constructed for use over a wide variety of pressure ranges up to as high as 6000 p.s.i. with smooth easy valving and extremely low turning torque. Evidence of the extremely low turning torque required resides in the fact that the handle 32 on a valving assembly designed for a one inch 600 p.s.i. valve is only six inches in length. The resultant rotary selector valve assembly will pass dirt-filled fluids without difficulty because of the minimum clearances between the mating parts which prevents dirt from getting between the bearing surfaces and the pressure balancing of the selector valving disc eliminates entirely any need for thrust members while at the same time permitting improved ease of operation throughout the entire range of operating pressures. The pressure seals provide a double seal which is effective regardless of flow direction and which increases in effectiveness as the fluid pressure increases. The extremely simple design and construction wherein none of the operative parts, except the seals, are pressure loaded assures long, satisfactory, trouble-free service with little up-keep and very low maintenance cost.

I have shown and described what I consider to be the preferred embodiment of my invention along with suggestions of modified forms and, it will be obvious to those skilled in the art, that other changes and modifications may be made without departing from the scope of my invention as defined by the appended claims.

I claim:

1. In a valve body having an enclosed valve chamber and a communicating fluid passageway with a movable gate member in the chamber, a seal comprising, a sleeve loosely disposed in the passageway, means spaced axially along the passageway from the valve chamber and forming a seat for the sleeve, resilient means coacting between the seat and the sleeve to urge the sleeve axially towards the valve chamber, an external peripheral groove on said sleeve forming raised peripheral shoulders at each end, a resilient annular sealing member seated in said groove and having a cross-sectional dimension less than the axial length of the groove, the end surface of said sleeve adjacent the valve chamber having an axial projecting flange at its external periphery adapted to continually seat against the gate member, said flange extending radially beyond the outer extremity of said peripheral groove, the remaining portion of said end surface being spaced inward axially therefrom and being of lesser dimension than the other end surface of the sleeve, said differential dimension between the respective end surfaces of the sleeve coacting with the resilient means and the annular resilient sealing member to urge said sleeve against the gate member to maintain a fluid tight seal between the passageway and the valve chamber during the flow of fluid through the passageway, said flange including a pressure loading surface facing in a direction generally opposite to that of the gate engaging end surface of said sleeve, said pressure loading surface extending radially beyond the outer extremity of said groove intermediate said groove and said gate engaging end surface of said sleeve and adapted for coaction with complementary surface means on said valve body generally adjacent said gate member to establish a pressure differential and maintain a fluid-tight seal between the valve chamber and the passageway when the valve is closed and fluid pressure exists in the valve body chamber, the active differential loading area of said sleeve being substantially the same whether the fluid pressure is in the passageways or in the valve body chamber, said active differential loading area on said sleeve being at least one half the magnitude of said gate engaging end surface of said sleeve, said resilient means having a bias sufficient to increase the contact pressure of the sleeve against the gate member by an amount supplied by a pressure area of at least half of the contact area of the sleeve with the gate member.

2. In a selector valve assembly having a valve body with fluid passageways adapted for selective communication through an internal valve chamber under control of a movable gate member therein, a fluid passageway seal comprising a sleeve seated in each respective passageway, said sleeve having an external peripheral groove, an annular resilient sealing member seated in said groove for sealing relation between the exterior of said sleeve and the respective passageway, the end surface of said sleeve adjacent said internal valve chamber having an undercut portion forming an axially projecting peripheral annular flange on said sleeve, said flange providing a generally axially facing end surface adapted to seat in sealing relation against a confronting surface of said gate member within the valve chamber, said flange end surface extending generally radially beyond the outer extremity of such peripheral groove, the other end surface of said sleeve being adapted to be exposed to fluid pressure in the corresponding passageway and presenting a greater surface to the fluid pressure than said undercut portion to provide a unidirectional pressure differential acting to maintain said flange end surface against said gate member when the gate member is open to admit fluid through said passageways, resilient means coacting between said other end surface of said sleeve and an abutment surface in the respective passageway to continuously urge said sleeve toward said gate member and thus supplement said unidirectional pressure differential, said resilient means having a bias sufficient to increase the contact pressure of said sleeve against said gate member by an amount supplied by a pressure area of at least one half of the contact area of the gate engaging end surface of said flange, said flange including a generally radially extending pressure loading surface disposed radially outwardly of said peripheral groove and intermediate said peripheral groove and said gate engaging end surface of said flange, said pressure loading surface facing in a direction generally opposite to said gate engaging end surface of said flange and adapted for coaction with a complementary confronting surface in the valve body to provide a pressure differential urging said sleeve against said gate member when the gate member is closed and fluid pressure exists in the valve body chamber.

3. In a valve in accordance with claim 1 wherein said surface means on said valve body includes a rabbeted edge around the respective passageway at the end adjacent said gate member, said flange extending radially into comparatively loose overlapping relation with said rabbeted edge to form said pressure loading surface on said flange for maintaining a sealed relation between the respective passageway and the valve chamber when there is no fluid flowing through the passageway.

References Cited in the file of this patent

UNITED STATES PATENTS

| | | |
|---|---|---|
| 2,519,574 | Holl | Aug. 22, 1950 |
| 2,603,449 | Overholser | July 15, 1952 |
| 2,653,003 | Overbeke | Sept. 22, 1953 |
| 2,688,981 | Greer | Sept. 14, 1954 |
| 2,696,219 | Barksdale | Dec. 7, 1954 |
| 2,796,230 | Grove | June 18, 1957 |

FOREIGN PATENTS

| | | |
|---|---|---|
| 655,077 | Great Britain | July 11, 1951 |
| 655,078 | Great Britain | July 11, 1951 |